(12) United States Patent
Little et al.

(10) Patent No.: US 10,843,630 B2
(45) Date of Patent: Nov. 24, 2020

(54) BACKING PLATE UNIT, METHOD FOR PRODUCING SUCH A BACKING PLATE UNIT AND REAR VIEW DEVICE FOR A MOTOR VEHICLE WITH SUCH A BACKING PLATE UNIT

(71) Applicant: SMR Patents S.à.r.l., Luxembourg (LU)

(72) Inventors: Andrew Brien Little, Portchester (GB); Stephen Edney, Portchester (GB); Harry Welfare, Portchester (GB); Andreas Herrmann, Stuttgart (DE)

(73) Assignee: SMR Patents S.à.r.l., Luxembourg (LU)

( * ) Notice: Subject to any disclaimer, the term of this patent is extended or adjusted under 35 U.S.C. 154(b) by 0 days.

(21) Appl. No.: 16/301,822

(22) PCT Filed: May 9, 2017

(86) PCT No.: PCT/EP2017/060986
§ 371 (c)(1),
(2) Date: Nov. 15, 2018

(87) PCT Pub. No.: WO2017/198491
PCT Pub. Date: Nov. 23, 2017

(65) Prior Publication Data
US 2019/0168673 A1    Jun. 6, 2019

(30) Foreign Application Priority Data
May 17, 2016   (DE) ................. 10 2016 109 052

(51) Int. Cl.
*B60R 1/08* (2006.01)
*B60R 1/12* (2006.01)

(52) U.S. Cl.
CPC .... *B60R 1/1207* (2013.01); *B60R 2001/1215* (2013.01); *B60R 2001/1223* (2013.01)

(58) Field of Classification Search
CPC .......... B60R 1/1207; B60R 2001/1215; B60R 2001/1213
(Continued)

(56) References Cited

U.S. PATENT DOCUMENTS 9,302,624 B2   4/2016   Lynam
9,434,313 B2   9/2016   Minikey et al.
(Continued)

OTHER PUBLICATIONS

International Search Report dated Jul. 12, 2017 of International application No. PCT/EP2017/060986.
(Continued)

*Primary Examiner* — Evan P Dzierzynski
*Assistant Examiner* — Keith G. Delahoussaye
(74) *Attorney, Agent, or Firm* — Jones Day

(57) ABSTRACT

A backing plate unit for a rear view device for a motor vehicle includes at least one opening passing from a rear side of a backing plate to a front side thereof to form a logo pattern by itself, first attachment means on the rear side of the backing plate for a light source, and light filter means and/or at least one extension which is extending from the front side of the backing plate in the region of the logo pattern. A method for producing such a backing plate unit and a rear view device with such a backing plate unit are also described.

18 Claims, 3 Drawing Sheets

(58) Field of Classification Search
USPC .......................................................... 362/494
See application file for complete search history.

(56) References Cited

U.S. PATENT DOCUMENTS

| | | | |
|---|---|---|---|
| 10,060,594 B2* | 8/2018 | Kurschner | ........... B60Q 1/2607 |
| 2010/0182143 A1* | 7/2010 | Lynam | ................. B60R 1/1207 |
| | | | 340/465 |

OTHER PUBLICATIONS

Written Opinion dated Jul. 12, 2017 of International application No. PCT/EP2017/060986.

* cited by examiner

BACKING PLATE UNIT, METHOD FOR PRODUCING SUCH A BACKING PLATE UNIT AND REAR VIEW DEVICE FOR A MOTOR VEHICLE WITH SUCH A BACKING PLATE UNIT

CROSS-REFERENCE TO RELATED APPLICATIONS

This application is a National Stage Entry of International Patent Application No. PCT/EP2017/060986, filed May 9, 2017, which claims the benefit of priority to German Patent Application No. DE 10 2016 109 052.2, filed May 17, 2016, each of which is incorporated by reference herein in its entirety for all purposes.

BACKGROUND OF THE INVENTION

1. Field of the Invention

The following description relates to a backing plate unit for a rear view device for a motor vehicle and a method of making same. A rear view device with such a backing plate unit is also described.

2. Related Art

US 2012/0147613 A1 describes a side rear view mirror assembly to be used in conjunction with a motor vehicle equipped with a blind spot sensor designed to detect objects in blind spots of the motor vehicle. The side rear view mirror assembly includes a base fixedly secured to the motor vehicle. A mirror case is movably secured to the base. The mirror case defines a housing and a mirror opening facing rearward. A backing plate is operatively connected to the mirror case facing rearward. The backing plate is movable with respect to the mirror case. A mirror glass is fixedly secured to the backing plate and movable therewith in a manner allowing an operator of the motor vehicle to view rearward of the motor vehicle. The side rear view mirror assembly also includes a blind spot indicator fixedly secured to the backing plate and in communication with the blind spot sensor to receive signals from the blind spot sensor and to indicate to the operator of the motor vehicle when an object is in a blind spot of the motor vehicle. The blind spot indicator is directed at the operator when the operator moves the backing plate to adjust the mirror glass. The indicator is integrated into the backing plate and has a small profile. The optical indicator is structured with at least one light source and a light guide designed as a wedge and forming a tray.

Referring to FIG. 3, a motor vehicle 10 is shown driving along a road 12 that has a dashed line 14 indicating a boundary of a lane of the road 12. The motor vehicle 10 is equipped with blind spot sensors 16, 18 disposed along each side 20, 22 of the motor vehicle 10. The motor vehicle 10 is also equipped with two side rear view mirror assemblies 24, 26 that extend out from each of these sides 20, 22 respectively. The side rear view mirror assemblies 24, 26 are used by an operator, graphically represented by a circle 28 in FIG. 3, to identify things that are going on outside the motor vehicle 10 rearwardly thereof. The operator 28 will adjust the side rear view mirror assemblies 24, 26 in a manner which allows the operator 28 to be satisfied that as much of the space rearward that can be viewed is being viewed by the operator 28. While most, if not all, motor vehicles 10 are equipped with two side rear view mirror assemblies 24, 26, the remainder of the description will focus on the side rear view mirror assembly 26 that is on the driver side 22 of the motor vehicle 10. It will be appreciated by those skilled in the art that the following description with regard to the driver side rear view mirror assembly 26 may apply equally to the rear view mirror assembly 24 on the passenger side 20 of the motor vehicle 10.

When an operator 28 uses a side rear view mirror assembly 26, it is typically adjusted such that the orientation of the mirror includes a portion of the driver side 22 of the motor vehicle therein. The operator 28 does this for purposes of orientation. As is shown in FIG. 3, the field of view for the side view mirror generally includes an angle $\alpha$. Disposed adjacent the field of view 29 that is visible to the operator 28 is what is commonly referred to as a blind spot 31 that extends generally through an angle $\beta$ The operator 28 cannot see what is in the blind spot 31, crosshatched in FIG. 3, without the head of the operator 28 turning in that direction. Said another way, the operator 28 cannot see anything that is in the blind spot 31 through angle $\beta$ by looking in the side rear view mirror assembly 26. It is the blind spot sensor 18 that determines whether an object 30, the motor vehicle 30 shown in FIG. 3, is in the blind spot. If so, the blind spot sensor 18 will transmit over the vehicle communication system an appropriate signal to eventually indicate to the operator 28 that an object does in fact exist in the blind spot 31. It will be the operator's decision as to whether the operator 28 will turn his or her head to view the object 30 or to operate as if the object 30 continues to be in the blind spot 31 and act accordingly with regard to the operation and direction of travel of the motor vehicle 10.

FIG. 4 is a view on the front side of a mirror glass and backing plate with indication signs of the side rear view assembly, as described by US 2012/0147613 A1. FIG. 5 is a cross section of the side rear view assembly of FIG. 4.

As can be seen in FIG. 4, a mirror glass 54 is cut to fit into a mirror opening (not shown) of a rear view mirror assembly, and a small icon 50 is engraved near an outboard edge of the mirror glass 54. The small icon 50 is an ISO symbol of two vehicles with one in an overtaking position with respect to another. Below the small icon 50 is a circle 51, through which the light of an indicator, discussed below, shines toward a driver of the vehicle to which the rear view mirror assembly is mounted. A backing plate 52 is adapted to a mount 55 having openings to allow the threading a wire harness for an actuator there through.

Disregarding the orientation with respect to the motor vehicle, the mirror glass 54 has a front side that is visible for the operator. On the back or rear side of the mirror glass 54 is a reflective surface 56 that reflects light in the visible spectrum, as shown in FIG. 5. The reflective material is normally a metal or an alloy that is sputter deposited onto the glass substrate. In the area of the circle 51, a portion of the reflective material or surface 54 is removed either totally, or to a defined remaining thickness by laser engraving. It is possible to use a very thin remaining reflective surface 56 which appears semi-transparent to an operator. Some mirror glasses have additional color protective layers to protect the reflective layer and to avoid a semi-transparent appearance. These color layers must also be removed for the indicator light to shine though the mirror glass. The backing plate 52 is attached to the mirror glass 54 normally by a double side glue foil. The backing plate 52 forms an integrated mounting surface 53 that receives and hosts the indicator light.

Referring to FIG. 5, the mounting surface 53 is formed to cover at least a printed circuit board 57, a light source 64 and a cover 58. The printed circuit board 57 is mounted on the bottom to the mounting surface 53 and the light source 64 such as an LED is attached on the top of the printed circuit board 57. The mounting surface 53 forms shoulders 61 to be used as bearing faces for the cover 58. End areas 63 of the cover 58 fit into the space that is formed by the shoulder 61 of the mounting surface 53. The cover 58 is formed as a plate to close the space created by the mounting surface 53 and is integrated into the cover 58. A light guiding pin 59 is also formed. The light guiding pin 59 is directed in direction to the LED and inclined with respect to the vertical by an angle θ. The angle θ allows a direction of light from the light source 64 into the light guide pin 59 through the circle opening 51 and the mirror glass 54 to a driver's eyes.

The assembly described by US 2012/0147613 A1 uses a plurality of parts.

A mirror reflective element sub-assembly suitable for use for a vehicular exterior rearview mirror assembly is also described by US 2016/0078768 A1 and includes a mirror reflective element, a signal indication module and a mirror back plate attached at the mirror reflective element. The signal indication module attaches to the mirror reflective element via an aperture of the back plate and has a light source that is activatable to emit light.

U.S. Pat. No. 7,944,371 B2 describes another mirror reflective element sub-assembly suitable for use for an exterior rearview mirror assembly of a vehicle, which includes a mirror reflective element, a mirror back plate having an indicator receiving portion established thereat, and a signal indication module having a light source. The signal indication module attaches to the indicator receiving portion of the mirror back plate and the light source may be activated to emit light through the indicator receiving portion. The light source is established at a circuit element and the signal indication module includes a housing that substantially encases the circuit element therein. The circuit element has electrical terminals extending therefrom and protruding at least partially at a connector portion of the housing so as to be electrically connectable to a power source of the vehicle. The connector portion of the housing is configured to provide a plug-socket connection between the power source and the signal indication module.

In US 2015/0003089 A1, a further mirror reflective element sub-assembly for an exterior rearview mirror assembly of a vehicle is described. It includes a mirror reflective element having a transparent substrate. A mirror reflector is disposed at a surface of the transparent substrate and a heater pad is disposed at a rear surface of the transparent substrate. A mirror back plate is disposed at the heater pad and has a first structure formed at a rear plate surface and configured to attach at an actuator of an exterior rearview mirror assembly. A blind spot indicator element is disposed at a second structure formed at the rear plate surface and includes a light source that may be activated to emit light. The blind spot indicator element and the second structure are configured so that light emitted by the blind spot indicator illuminates an icon so that the illuminated icon is principally viewed by a driver of the vehicle.

A rear view mirror for a vehicle, preferably for a motor vehicle, is described by DE 20 2015 104 690 US, with a mirror glass and a display device. A carrier plate for supporting the mirror glass is provided with integrated light guide of the display device, where light of at least one light source passes through the light guide and the mirror glass for displaying information.

US 2006/0210709 Ak1 describes a method for producing an anisotropic film, which does not require a light irradiation device having a special mechanism or an advanced alignment adjustment system. A film containing a photoreactive material is arranged on a polarizing element, and an anisotropy is provided to the film containing a photoreactive material by irradiating the film with light through the polarizing element. With this method, an anisotropic film can be formed on the polarizing element.

US 2006/0204678 A1 describes an optical film whose retardation distribution is uniform, whose rainbow-like irregularity is suppressed, whose color is transparent, and whose optical characteristics are extremely good. A birefringent material containing a non-liquid crystal polymer is dissolved in methyl isobutyl ketone so as to prepare a coating solution. This coating solution is applied onto a transparent film, thus forming a coating film. By drying the coating film, an optical film having a birefringent layer formed on the transparent film is obtained. As the non-liquid crystal polymer, it is possible to use polyimide that has a birefringence (Deltanxyz) in a thickness direction when formed into a film of at least 0.03 and is soluble in methyl isobutyl ketone.

SUMMARY

In one aspect, a backing plate unit for a rear view device for a motor vehicle includes at least one opening passing from a rear side of a backing plate to a front side thereof to form a logo pattern by itself, a first attachment means on the rear side of the backing plate for a light source, and a light filter means and/or at least one extension, which is extending from the front side of the backing plate, in the region of the logo pattern.

The logo pattern may be provided by one opening in the form of an icon or a plurality of openings forming an icon, and/or each opening forming the logo pattern is passing through the extension.

The first attachment means can include a supporting means, preferably having spigots on the rear side for supporting the light source such as a PCB, and/or a mounting structure for a snap connection including at least one wall and/or clips on the rear side for holding the light source, in particular a PCB thereof, preferably on the supporting means.

The extension may be arranged in the region of the first attachment means, preferably in the region of the mounting structure, in particular between two walls.

The second attachment means for an actuator of a reflective element may be provided on the rear side of the backing plate, with the second attachment means preferably including a mounting structure for a snap connection.

The light filter means may include a wooden pulp filter.

The wooden pulp filter may be placed on the rear side of the backing plate, the PCB may be placed on the rear side of the wooden pulp filter and a coat may be placed on the rear side of the PCB and at least a part of the rear side of the backing plate surrounding the PCB.

The wooden pulp filter may be placed on the front side of the backing plate and a coat may be placed on the front side of the wooden pulp filter and at least a part of the front side of the backing plate surrounding the wooden pulp filter.

In another aspect, a method for producing a backing plate may include forming the backing plate together with the logo pattern and the first attachment means in a first molding step, in particular by injection molding.

The backing plate may be formed together with the logo pattern, the first attachment means and the second attachment means in a first molding step, in particular by injection molding.

The light filter means may be secured to the backing plate in a second molding and/or a coating step.

In another aspect, a rear view device includes a backing plate unit with a reflective element being attached to the front side of the backing plate and a light source, preferably a light source as well as an actuator, being attached to the rear side of the backing plate.

The reflective element may include a mirror glass or a transparent substrate, in particular a glass element, with a translucent coating, preferably including chrome on its rear side.

The light filter means, in particular in form of a wooden pulp filter, may be arranged either between the front side of the backing plate and the reflective element or between the rear side of the backing plate and the light source, in particular the PCB thereof.

The reflective element may be attached via a coating securing the wooden pulp filter on the backing plate.

A heater pad may be arranged between the reflective element and the backing plate, with the heater pad being provided with an opening through which the light filter means and/or the at least one extension extend(s).

The extension may abut against the reflective element, or a gap may be provided between the extension and the reflective element, with the gap preferably being smaller than 1.25, in particular between 0.01 mm and 1.25 mm.

A number of example functions and features included by a backing plate are, for example: a logo patter, attachment means for a PCB with LEDs, a mirror glass, a light filter means, an extension in the region of the logo pattern, and attachment means for an actuator, among others.

A reduced amount of parts may be handled during assembly of a rear view mirror assembly. The need of a blind spot indicator module may be made superfluous and costs may be reduced.

BRIEF DESCRIPTION OF THE DRAWINGS

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

DETAILED DESCRIPTION

Figure 1:
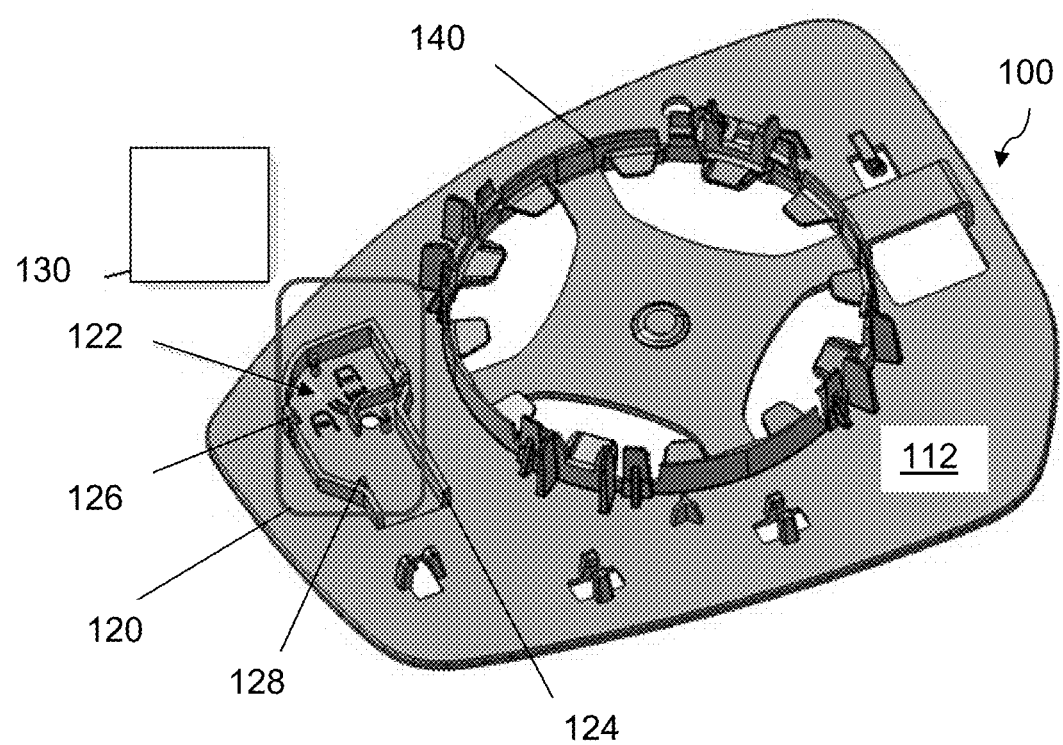
FIG. 1 is an exploded view of an example of a first backing plate unit.

Before explaining at least one example of the invention in detail, it is to be understood that the invention is not limited in its application to the details of construction and to the arrangements of the components set forth in the following description or illustrated in the drawings. The Figures and written description are provided to teach any person skilled in the art to make and use the inventions for which patent protection is sought. The invention is capable of other embodiments and of being practiced and carried out in various ways. Those skilled in the art will appreciate that not all features of a commercial embodiment are shown for the sake of clarity and understanding. Persons of skill in the art will also appreciate that the development of an actual commercial embodiment incorporating aspects of the present inventions will require numerous implementationspecific decisions to achieve the developer's ultimate goal for the commercial embodiment. While these efforts may be complex and time-consuming, these efforts nevertheless would be a routine undertaking for those of skill in the art having the benefit of this disclosure.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity in specific reference to the Figures and are not intended to limit the scope of the invention or the appended claims. Further, it should be understood that any one of the features of the invention may be used separately or in combination with other features. Other systems, methods, features, and advantages of the invention will be or become apparent to one with skill in the art upon examination of the Figures and the detailed description. It is intended that all such additional systems, methods, features, and advantages be included within this description, be within the scope of the present invention, and be protected by the accompanying claims.

It will be appreciated by those skilled in the art that changes could be made to the embodiments described above without departing from the broad inventive concept thereof. It is understood, therefore, that the invention disclosed herein is not limited to the particular embodiments disclosed, but it is intended to cover modifications within the spirit and scope of the present invention as defined by the appended claims.

FIG. 1 illustrates an example of a backing plate 100 viewed from its rear side 112. The backing plate 100 includes a blind spot indicator location 120 with an incorporated logo pattern 122 in form of through holes, walls 124 between which a printed circuit board (PCB) with lights sources like LEDs is to be inserted and spigots 128 onto which the PCB can be placed. The LEDs can generate light in Amber color to be balanced by a wooden pulp filter 130 to give an even display of light. The PCB is attachable to the backing plate 100 via a snap connection with the help of clips 126 preferably provided by the walls 124.

The backing plate 100 can be injection molded together with an icon or logo pattern defining openings and passing from the rear side 112 to the front side to form the logo pattern 122, the spigots 128 on the rear side 112 for supporting the PCB, the walls 124 and the clips 126 on the rear side 112 for the holding the PCB on the spigots 128, and a mounting structure 140 for an actuator of a mirror glass, where the mirror glass is configured to be arranged on the front side of the backing plate 100 and the actuator on the rear side 112 of the baking plate 100.

The wooden pulp filter 130 may be applied to the front side on the backing plate 100 in the region of the logo pattern 122 and fixed there by a further molding process before the mirror glass is attached to the front side.

The PCB together with the wooden pulp filter may be fit on the front side of the PCB on the rear side of the backing plate in the region of the logo pattern 122 and may conformably coat the assembly, preferably by a further molding process.

In both cases, the backing plate 100 and the wooden pulp filter 130 may be fixedly attached thereto, together with the PCB or without the PCB, to provide a single unit being the backing plate unit.

Figure 2:
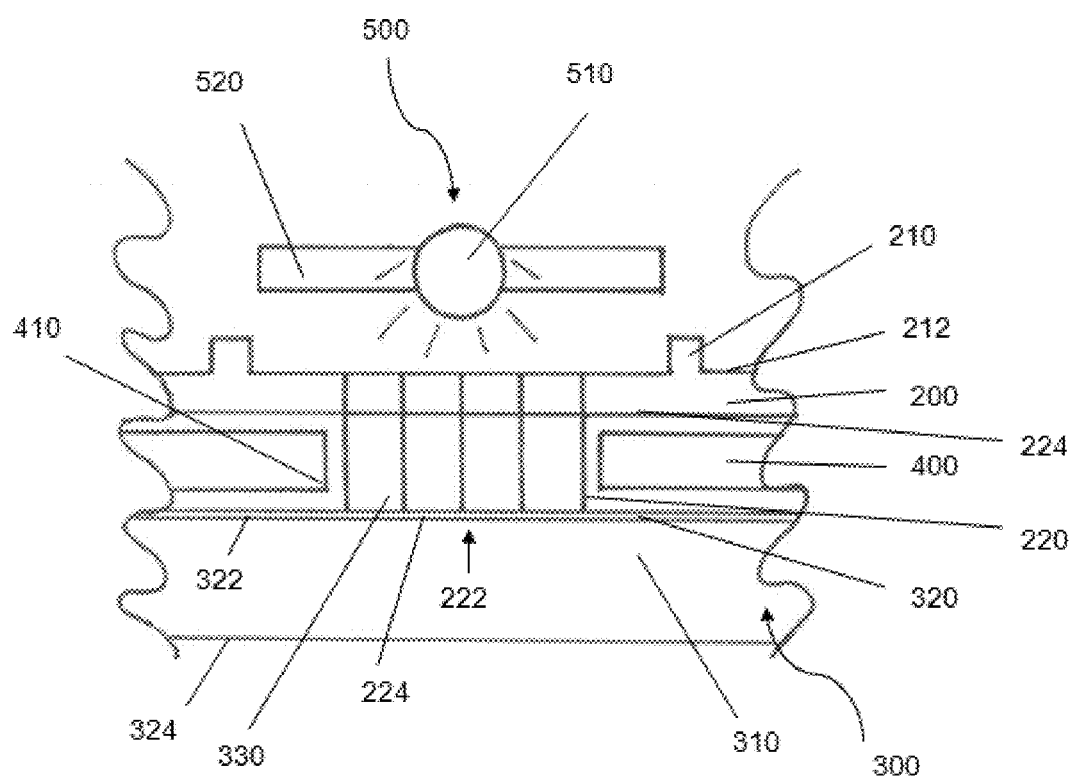
FIG. 2 is a cross section extending through a part of an example of a second backing plate unit between a reflective element with a heater pad and a light source.
Figure 3:
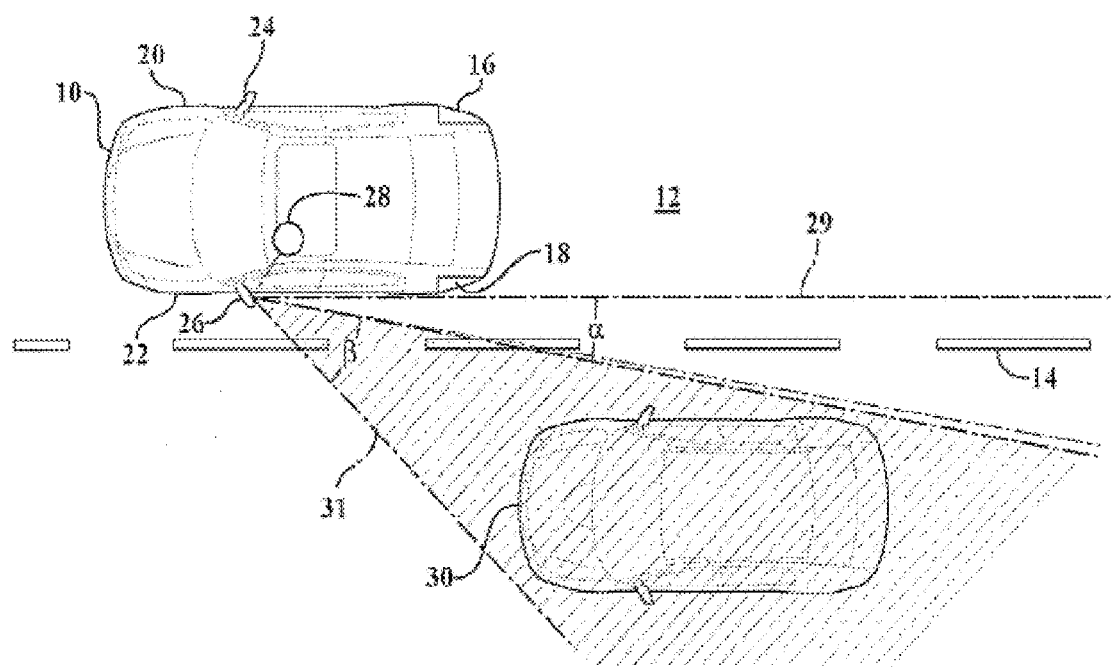
FIG. 3 is a top view of a motor vehicle with a second motor vehicle located in a blind spot of the first motor vehicle.
Figure 4:
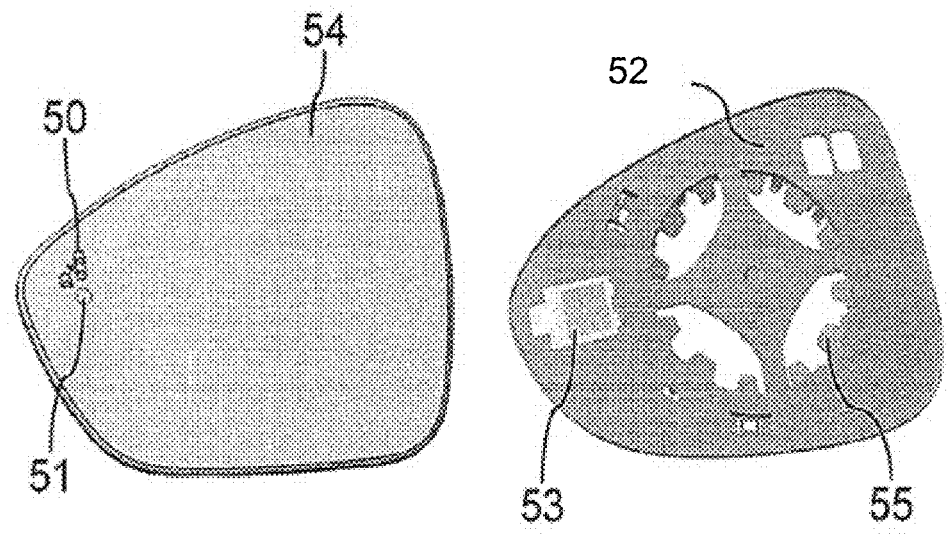
FIG. 4 is a view of a prior art mirror glass and backing plate with indication signs.
Figure 5:
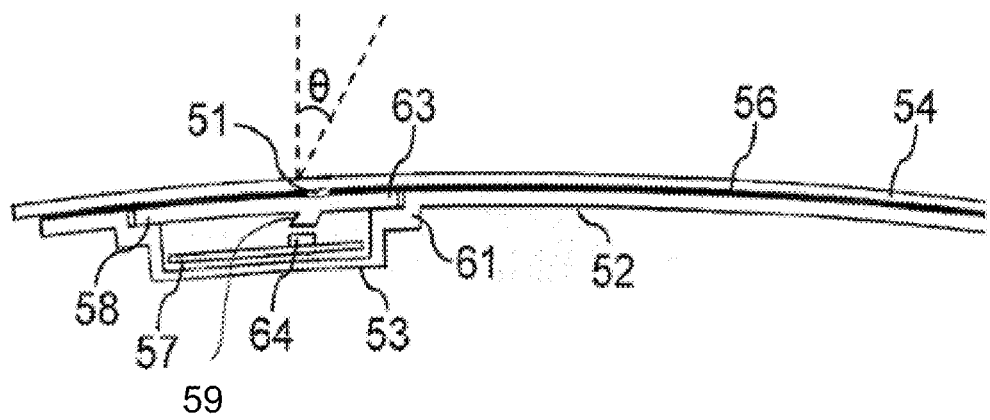
FIG. 5 is a cross section of the mirror glass of FIG. 4.

FIG. 2 illustrates a part of a backing plate 200 of another example, in cross section. The backing plate 200 may be formed together with walls 210 on its rear side 212, and an extension 220 with a logo pattern 222 may extend from its front side 224.

The extension 220 may extend towards a reflective element 300 including, in this example, a glass element 310 with a translucent chrome coating 320 on its rear side 322. Between the backing plate 200 and the reflective element 300, a heater pad 400 may be arranged. The heater pad 400 may be provided with an opening 410 through which the extension 220 passes.

The extension 220 may provide the logo pattern 222 which is defined by openings through the backing plate 200. The extension 220 may be arranged between the walls 210, between which a light source 500 including an LED 510 on a PCB 520, is to be inserted. Thus, the light from the light source 500 may pass through the openings within the extension 220 prior to impinging onto the reflective element 300.

Still further, the extension 220 can abut against the reflective element 300 or a gap can be provided between the extension 220 and the reflective element 300. The gap between the extension 220 and the reflective element 300 may determine the sharpness of the logo pattern 220 seen at the front side 324 of the reflective element 300. Smaller gaps lead to sharper logo patterns.

Preferably the gap may be between 0.01 mm and 1.25 mm.

The backing plate 200 can be formed be injection molding together with openings passing from its rear side 212 through the extension 220 to its front side 224 to form the logo pattern 222 and together with the walls 210 on its rear side 212 for the attachment of the light source 500.

A wooden pulp filter 330 may be applied to the front side of the extension of the backing plate and fixed there by a further molding process before the reflective element is attached.

In various example advantages, the backing plate unit allows an easy and fast manufacturing of a rear view mirror assembly for a motor vehicle without the need of a separate blind spot indicator module.

The foregoing discussion discloses and describes merely exemplary embodiments of the present invention. One skilled in the art will readily recognize from such discussion, and from the accompanying drawings and claims, that various changes, modifications or variations can be made therein without departing from the spirit and scope of the invention as defined in the following claims.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent presently preferred embodiments of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

REFERENCE SIGNS 10 motor vehicle
12 road
14 dashed line
16 blind spot sensor
18 blind spot sensor
20 side of the motor vehicle
22 side of the motor vehicle
24 side rear view mirror assembly
26 side rear view mirror assembly
28 operator
29 field of view
30 object
31 blind spot
50 symbol
51 circle
52 backing plate
53 mounting surface
54 mirror glass
55 mount for actuator
56 reflective surface mirror
57 printed circuit
58 cover
59 light guide pin
61 shoulder
63 end area of cover
64 light source
100 backing plate
112 rear side
120 blind spot indicator location
122 logo pattern
124 wall
126 clip
128 spigot
130 wooden pulp filter
140 mounting structure for actuator
200 backing plate
210 wall
212 rear side
220 extension
222 logo pattern
224 front side
300 reflective element
310 glass element
320 translucent chrome coating
322 rear side
324 front side
400 heater pad
410 opening
500 light source
510 LED
520 PCB

What is claimed is:

1. A backing plate unit for a rear view device for a motor vehicle, comprising:
 a backing plate;

at least one opening passing from a rear side of the backing plate to a front side of the backing plate to form a logo pattern;
a first attachment means on the rear side of the backing plate for a light source; and
at least one of a light filter means and at least one extension in a region of the logo pattern,
wherein the at least one of the light filter means and the at least one extension are extending from the front side of the backing plate, and
wherein the at least one extension is extending directly from a front surface of the backing plate.

2. The backing plate unit of claim 1, wherein at least one of
the logo pattern is provided by one opening forming an icon or a plurality of openings forming an icon, and
each opening forming the logo pattern is passing through the at least one extension.

3. The backing plate unit of claim 1, wherein the first attachment means comprises at least one of:
supporting means comprising spigots on the rear side (112) for supporting the light source and a PCB thereof; and
a mounting structure for a snap connection comprising at least one of at least one wall and clips on the rear side for holding the light source and the PCB on the supporting means.

4. The backing plate unit of one of claim 1, wherein the at least one extension is arranged in the region of the first attachment means and the region of the mounting structure between two walls.

5. The backing plate unit of one of claim 1, wherein a second attachment means for an actuator of a reflective element are provided on the rear side of the backing plate, the second attachment means comprising a mounting structure for a snap connection.

6. The backing plate unit of one of claim 1, wherein the light filter means comprises a wooden pulp filter.

7. The backing plate unit of claim 6, wherein the wooden pulp filter is placed on the rear side of the backing plate, the PCB is placed on the rear side of the wooden pulp filter, a coat is placed on the rear side of the PCB, and at least a part of the rear side of the backing plate is surrounding the PCB.

8. The backing plate unit of claim 6, wherein the wooden pulp filter is placed on the front side of the backing plate, a coat is placed on the front side of the wooden pulp filter, and at least a part of the front side of the backing plate surrounds the wooden pulp filter.

9. A method for producing a backing plate unit, comprising:
providing a backing plate unit for a rear view device for a motor vehicle, comprising:
a backing plate;
at least one opening passing from a rear side of the backing plate to a front side of the backing plate to form a logo pattern;
a first attachment means on the rear side of the backing plate for a light source; and
at least one of a light filter means and at least one extension in a region of the logo pattern,
wherein the at least one of the light filter means and the at least one extension is extending from the front side of the backing plate, and
wherein the at least one extension is extending directly from a front surface of the backing plate; and
forming the backing plate together with the logo pattern and the first attachment means in a first molding step by injection molding.

10. The method of claim 9, wherein the forming of the backing plate further comprises forming the backing plate together with the logo pattern, the first attachment means, and a second attachment means in a first molding step by injection molding.

11. The method of claim 9, further comprising securing the light filter means to the backing plate in a second molding or a coating step.

12. A rear view device, comprising:
a backing plate unit for a rear view device for a motor vehicle, comprising:
a backing plate;
at least one opening passing from a rear side of the backing plate to a front side of the backing plate to form a logo pattern;
a first attachment means on the rear side of the backing plate for a light source; and
at least one of a light filter means and at least one extension in a region of the logo pattern,
wherein the at least one of the light filter means and the at least one extension is extending from the front side of the backing plate, and
wherein the at least one extension is extending directly from a front surface of the backing plate;
a reflective element being attached to the front side of the backing plate; and
a light source as well as an actuator being attached to the rear side of the backing plate.

13. The rear view device of claim 12, wherein the reflective element comprises a mirror glass or a transparent substrate including a glass element (310), with a translucent coating comprising chrome on its rear side.

14. The rear view device of claim 12, wherein the light filter means comprises a wooden pulp filter and is arranged either between the front side of the backing plate and the reflective element or between the rear side of the backing plate and the light source and a PCB thereof.

15. The rear view device of claim 14, wherein the reflective element is attached via a coating securing the wooden pulp filter on the backing plate.

16. The rear view device of claim 12, wherein a heater pad is arranged between the reflective element and the backing plate with the heater pad being provided with an opening through which at least one of the light filter means and the at least one extension extend.

17. The rear view device of claim 12, wherein:
the extension abuts against the reflective element, or
a gap is provided between the extension and the reflective element, with the gap being smaller than 1.25 mm and between 0.01 mm and 1.25 mm.

18. A backing plate unit for a rear view device for a motor vehicle, comprising:
a backing plate;
at least one opening passing from a rear side of the backing plate to a front side of the backing plate to form a logo pattern;
a first attachment means on the rear side of the backing plate for a light source; and
at least one of a light filter means and at least one extension in a region of the logo pattern,
wherein the at least one of the light filter means and the at least one extension are extending from the front side of the backing plate, and wherein a heater pad is arranged between a reflective element and the backing plate with the heater pad being provided with an opening, and at least one of the light filter means and the at least one extension extend through the opening to pass from a rear side of the heater pad to a front side of the heater pad.

* * * * *